(No Model.) 2 Sheets—Sheet 2.

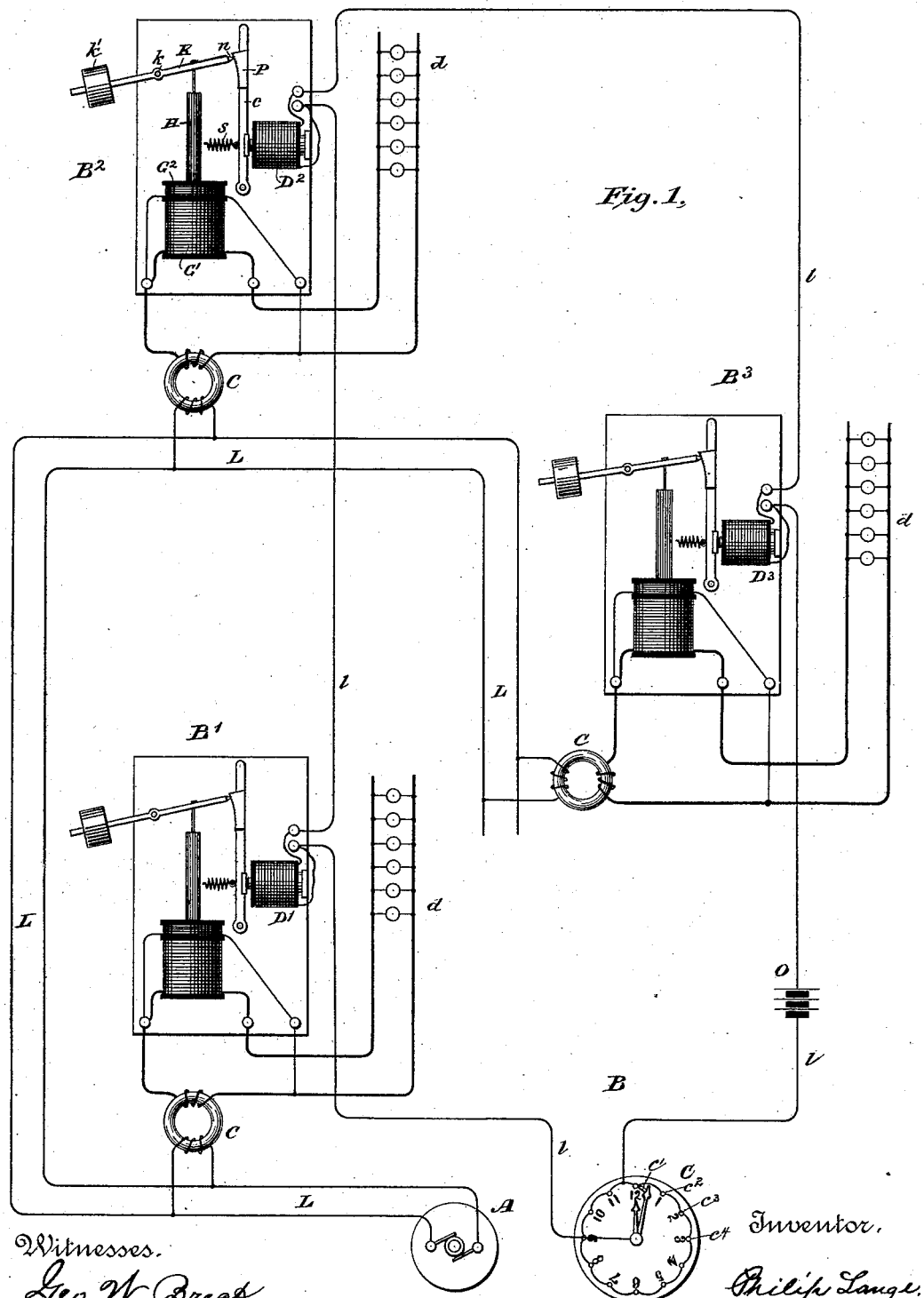

P. LANGE.
ELECTRIC METER.

No. 392,437. Patented Nov. 6, 1888.

Witnesses,
Geo. W. Breck
Edward Thorpe

Inventor,
Philip Lange
By his Attorneys
Pope Edgecomb & Terry

UNITED STATES PATENT OFFICE.

PHILIP LANGE, OF PITTSBURG, PENNSYLVANIA, ASSIGNOR TO THE WESTINGHOUSE ELECTRIC COMPANY, OF SAME PLACE.

ELECTRIC METER.

SPECIFICATION forming part of Letters Patent No. 392,437, dated November 6, 1888.

Application filed January 21, 1888. Serial No. 261,440. (No model.)

*To all whom it may concern:*

Be it known that I, PHILIP LANGE, a citizen of the United States, residing in Pittsburg, in the county of Allegheny, in the State of Pennsylvania, have invented certain new and useful Improvements in Electric Meters, (Case 201,) of which the following is a specification.

The invention relates to the class of devices employed for measuring electric currents and recording the current consumed.

The object of the invention is to provide reliable and accurate means for giving a record of the ampères of current consumed at any required stations at any given time.

The invention consists in providing suitable means for periodically placing an ammeter in condition to be operated by the current traversing it and at the same moment storing up a force sufficient to move the recording device a distance corresponding to and dependent upon the ampères at that time being used.

In carrying out the invention there is placed at a central station or other convenient point a circuit-controlling device adapted to send impulses over a given circuit periodically. In this circuit there are included electro-magnets, one being employed for each meter. Each time such electro-magnets are vitalized—say, every five minutes or at other convenient intervals— the armatures are released and allowed to set themselves individually in positions corresponding to the currents traversing their respective coils. Upon the cessation of an impulse the armature-levers of the magnets are drawn from their respective magnets distances corresponding to and dependent upon the positions of the meter-levers. As each armature is thus drawn back, it moves its recording device a corresponding distance. Other methods of vitalizing the magnets may be employed, but that here described will serve to illustrate the invention. In an application of Alexander Wurts, of even date herewith, there is described the general plan of operating the electro-magnets by means of a circuit-closer at a central station, and I do not claim, broadly, such a system.

Figure 3:
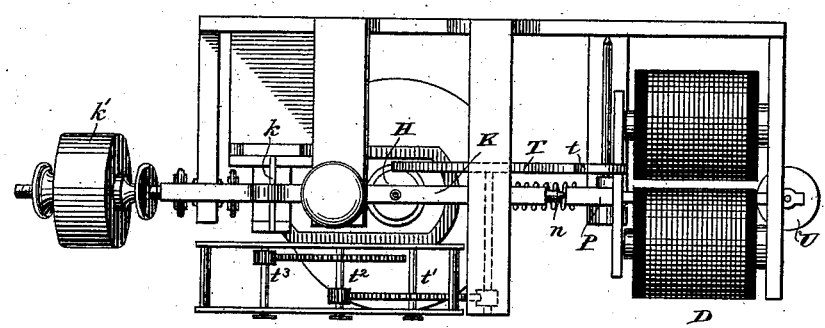
Figure 2:
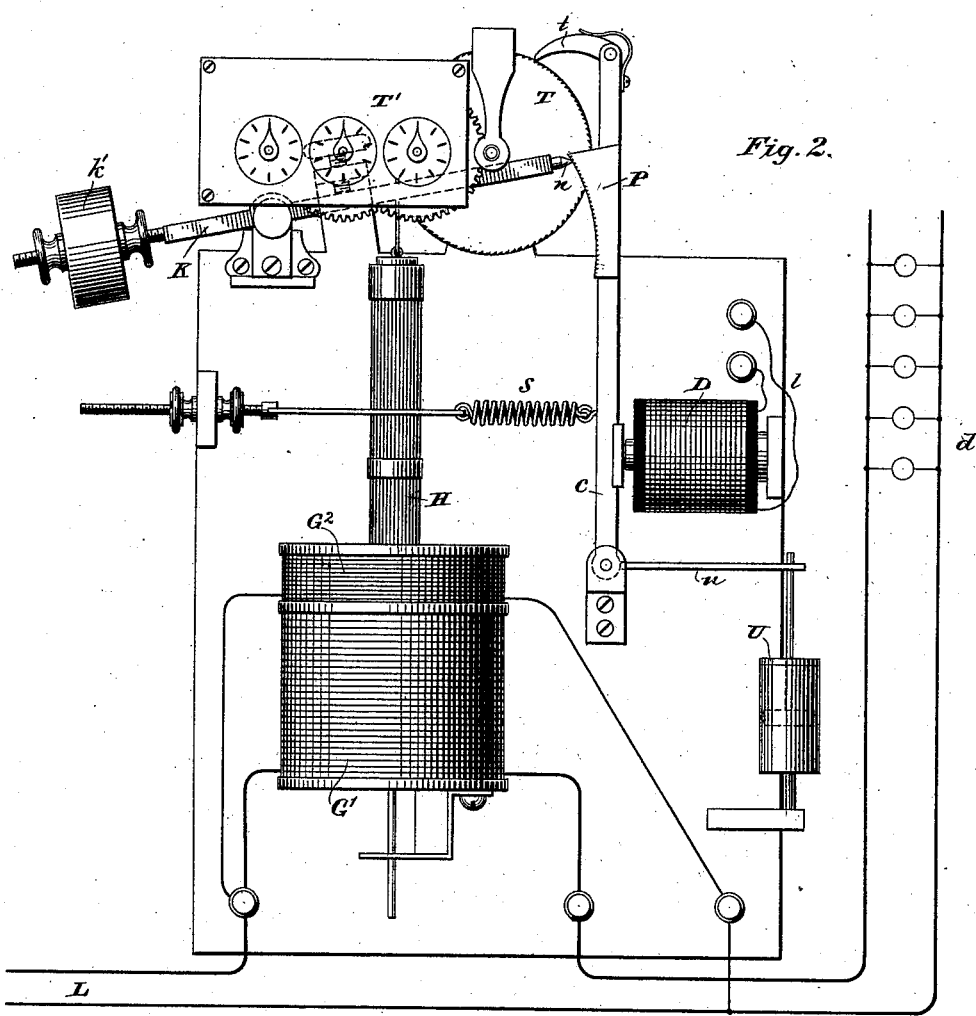

In the accompanying drawings, Figure 1 is a diagram showing the general organization of the circuits and apparatus. Figs. 2 and 3 are respectively a side elevation and a plan of an individual instrument.

Referring to the figures, A represents a suitable source of electric currents, and L its circuit. The conductor L leads to the several stations represented at $B'$ $B^2$, &c. A second conductor, $l$, leads from the central station, B, to the stations $B'$ $B^2$, &c. In this conductor there is included at the central station a suitable automatic circuit-controlling device, such as is shown at C, for instance. This operates to close the circuit-connections of a battery or other suitable source of electricity, as indicated at O, at stated intervals—for instance, every five minutes or other desired times. This device C may consist of a mechanical clock-train having a circuit-closing attachment of any well-known character—such as is graphically represented by the contact-arm $c'$ and contact-points $c^2$ $c^3$ $c^4$, &c.—located at the proper intervals. The arm $c'$ is connected with one pole of the source O, while the several points are connected together and with the line $l$ which returns to the opposite pole of the source O.

In the conductor $l$ there is included at each station an electro-magnet, as shown at $D'$ $D^2$, &c. These are employed for setting in operation or controlling the meters at the different stations.

Each meter consists of two coils, $G'$ and $G^2$, the former of which is included in series with the translating devices $d$ $d$, supplied in this instance through converters from the circuit L, while the coil $G^2$ is included in shunt-circuit upon the devices. These coils are provided with a core, H, preferably of soft-iron wires electrically insulated from each other. The core is suspended from a lever, K, which is carried upon a knife edge or pivot, $k$. A counterpoise, $k'$, is adjustable upon the lever and serves to balance both the weight of the core and the pull exerted by the current traversing the shunt-coil $G^2$.

The lever K carries a point or knife-edge, $n$, which moves in front of the face of a curved plate, P, as the core is moved within the coils. The plate P is carried upon a lever, $c$, of the electro-magnet D. The face of the plate is indented, roughened, or corrugated, so that the point will not slip along its surface when the two are in contact. A spring or weight, s, tends to hold the lever away from its magnet, with the plate resting against the point. When the magnet is vitalized, the point is released by a very slight movement of the lever c. The lever K thereupon adjusts itself to whatever position the coil G' may require. Upon the interruption of the current through the magnet D the lever c will move under the influence of the spring or weight s until the plate P comes against the point n at the end of the lever K. Upon the lever c there is carried a pawl, t, which engages the teeth of a wheel, T. This wheel therefore will be turned a distance dependent upon the movement of the lever from its magnet, and therefore, since this movement is greater or less, accordingly as the core H is drawn a greater or less distance into the coils G' and $G^2$, a corresponding registration will be made upon the train T''. This train, it is evident, may be of any suitable character. That here shown consists of three dials having indicators driven through suitable gear wheels or pinions, as shown at $t'$ $t^2$ $t^3$. It is obvious that by varying the form of the curve of the plate P the rate of movement of the wheel T may be varied and the apparatus thereby adapted to the requirements of any particular case.

The registration which is performed by the dials may be made to show the ampère-hours, the lamp-hours, or the money value directly by varying the ratio of the current-unit to the teeth upon the wheel T or to the gear-wheels.

When the meter is out of circuit and no current is being consumed, the lever K will rest against the upper portion of the curved plate P, and this will prevent any movement of the lever c sufficient to carry forward the recording-wheel T.

For the purpose of steadying the movements of the lever c and to prevent any movement from a sudden jarring of the device a suitable dash-pot, U, may be applied to the extension n of the lever c.

I claim as my invention—

1. In a system of electrical distribution, an electric meter located at a sub-station, consisting of the combination of a solenoid, a core acted upon thereby, a limiting-stop set in position by means of the core, a recording-wheel, a lever for actuating the same, means for periodically vibrating the lever a distance depending upon the position of said limiting-stop, and thereby actuating the recording-wheel, consisting of a spring or weight tending to move the lever in one direction and an electro-magnet for moving it in the opposite direction, a circuit-controller at the central station, an independent circuit leading therefrom to the said electro-magnet, and an independent source of electricity included in said circuit.

2. In an electric meter, the combination of two stationary solenoids of different resistances, a single iron core acted upon by and movable with reference to both of said solenoids, and a lever carrying the core, one of said solenoids being connected in series with the work-circuit and the other having its terminals connected in shunt upon both the work-circuit and said series solenoid.

3. The combination of two solenoids of different resistances, an iron core acted upon by both of said solenoids, a lever carrying the core, a train of wheels, a lever periodically operating the train of wheels, and an adjustable stop carried by the first-named lever whose position is regulated by the current traversing said solenoids.

4. A meter for an electric circuit, consisting of the combination of a solenoid designed to be included in such circuit, a core acted upon thereby, a lever from which the core is suspended, a recording-train, a lever for actuating the latter, a spring or weight under the influence of which the latter lever actuates, an electro-magnet periodically renewing the tension of the spring or weight, a limiting-stop upon the first-named lever for controlling the distance the second lever moves under the influence of the spring, an independent electric circuit in which the electro-magnet is included, and a circuit-controller also included in said independent circuit.

5. In an electric meter, the combination of a lever, an electro-magnet or equivalent device for moving it in one direction and a spring or weight for moving it in the opposite direction, a plate having a corrugated, indented, or roughened curved surface carried upon the lever, an adjustable point moving along said surface and allowing a greater or less amplitude of movement of the lever, according to its position, and an electro-magnet or equivalent device for controlling the position of the point with reference to the curved surface.

6. In an electric meter, the combination of a lever, an electro-magnet or equivalent device for moving it in one direction and a spring or weight for moving it in the opposite direction, a plate having a curved, corrugated, indented, or roughened surface carried upon the lever, an adjustable point moving along said surface and allowing a greater or less amplitude of movement of the lever, according to its position, an electro-magnet or equivalent device for controlling the position of the point with reference to the curved surface, and a dash-pot applied to said lever, securing a slow regulated movement thereof.

7. In an electric meter, two independent assisting-coils, one adapted to be connected in series with the work-circuit and the other in shunt therefrom, a core receiving constant polarization from the shunt-coil, an indicating device consisting of mechanism brought into action at regularly-recurring intervals, and connections between said core and mechanism whereby the degree of movement of the registering mechanism is controlled by the position of the core in the coils.

8. In a system of electrical distribution, the combination of a meter at each sub-station, a registering device applied to each meter, a lever for operating each registering device, an electro-magnet for operating each lever, a movable arm controlled by the meter, whose position serves to regulate the extent of movement of the corresponding lever and consequently of the registering or indicating mechanism controlled thereby, an independent circuit extending from the central station through all of said electro-magnets, and a circuit-controller for periodically vitalizing the electro-magnets and thereby operating the levers, substantially as described.

In testimony whereof I have hereunto subscribed my name this 24th day of December, A. D. 1887.

PHILIP LANGE.

Witnesses:
W. D. UPTEGRAFF,
CHARLES A. TERRY.